United States Patent

You

[11] Patent Number: 5,830,520
[45] Date of Patent: Nov. 3, 1998

[54] METHOD FOR SELECTIVELY CONTROLLING A FINISHED COOKING STATE OF BOILED RICE

[75] Inventor: Sang-Uk You, Kyeongki-Do, Rep. of Korea

[73] Assignee: Daewoo Electronics Co., Ltd., Seoul, Rep. of Korea

[21] Appl. No.: 704,981

[22] Filed: Aug. 29, 1996

[30]   Foreign Application Priority Data

Aug. 30, 1995 [KR]   Rep. of Korea .................. 1995 27573
Aug. 30, 1995 [KR]   Rep. of Korea .................. 1995 27574

[51] Int. Cl.$^6$ ....................................................... A23L 1/00
[52] U.S. Cl. ............................ 426/233; 99/327; 219/441; 426/523
[58] Field of Search ...................... 426/231, 233, 426/508, 523; 219/441; 99/326, 327, 403

[56]   References Cited

U.S. PATENT DOCUMENTS 4,438,324   3/1984   Narita et al. .............................. 219/441
4,670,282   6/1987   Onishi et al. ............................. 426/508
4,818,547   4/1989   Miwa et al. .............................. 426/233

*Primary Examiner*—George Yeung
*Attorney, Agent, or Firm*—Pillsbury Madison & Sutro LLP

[57] ABSTRACT

The present invention relates to a method for selectively controlling a rice cooking process of an electric rice cooking kettle which includes a state selecting key, a control section, a data storing section, an internal pot temperature sensor, and a heater. The method can selectively cook a rice to different states such as a medium rice, a hard-boiled rice, or a sticky rice, without adjusting a water amount during cooking, and can change the state of boiled rice during the cooking process prior to a heat-preserving point.

20 Claims, 11 Drawing Sheets

METHOD FOR SELECTIVELY CONTROLLING A FINISHED COOKING STATE OF BOILED RICE

BACKGROUND OF THE INVENTION

1. Field of the Invention

The present invention relates to a method for selectively controlling a finished cooking state of boiled rice. More particularly, the present invention relates to a method for selectively controlling the cooking of rice to different states such as a medium rice, a hardboiled rice, or a sticky rice, without a user having to adjust a water amount during cooking, and capable of changing the state of boiled rice during the cooking process prior to a heat-preserving point during cooking.

2. Description of the Prior Art

Recently, an electric rice cooking kettle has an operation condition by processes according to each contents, which a cooking process starts according to an operating a cooking key after a status which an internal pot is placed therein is sensed at first.

An operation of a process for cooking cleaned rice, which is one example of a cooking process of the general electric rice cooking kettle, will be described with reference to FIG. 1. FIG. 1 shows a graph for illustrating a general cooking process of an electric rice cooking kettle.

At first, when an internal pot is placed in the electric rice cooking kettle a key senses the placement of the internal pot. A user pushes a menu key and pushes a key for starting a rice cooking, so that a progressive program is activated. The electric rice cooking kettle then progress through a number of processes. That is, a process for cooking a rice is performed in the order of an absorbing (soaking) process, a heating process, a heat preserving process, and a steaming process. The absorbing process is completed by heating a heater included in the electric rice cooking kettle for 10 minutes so that the temperature of the internal pot, that is, that of a cooking rice, is increased from 25° C. to 45° C., and thus soaking the cooking rice at the temperature 45° C. The heating process includes a first heating process and a second heating process. After the absorbing process is finished, the first heating process is performed by heating the heater for 4 minutes so that the temperature of the cooking rice is increased from 45° C. to 75° C. Then, the second heating process is performed by heating the heater for 2 minutes so that a temperature of the cooking rice is increased from 75° C. to 102° C. Then, the heat-preserving process is carried out by heating the heater for 3 minutes so that the temperature of the cooking rice can be increased from 102° C. to 125° C. Then, the steaming process is completed by keeping the cooking rice at 125° C. for 10 minutes. When the cooking process is finished, a display indicates that the rice has been cooked completely. As mentioned previously, the user can confirm that the cooking process is advancing through the different processes after the internal pot is placed in the electric rice cooking kettle.

However, because the process for cooking a rice advances sequentially through process having fixed predetermined reference values corresponding to a standard state, it can not adapt for any active change in the status of the rice. In particular, the conventional method for cooking a rice is more disadvantages than a method which selects a rice state such as a medium rice, a hardboiled rice, or a sticky rice and cooks a rice. For instance, in the conventional method, the process for cooking a rice is set, so in order to change one selection of the rice state during the middle of the cooking process, the user must increase or reduce the amount of water in the internal pot. To do this, the user must open and close a cover of the electric cooking kettle and adjust the water amount. Accordingly, the method has the disadvantages that the taste of the boiled rice is lowered and that the user can not select a state of a boiled rice according to circumstances.

Therefore, a method is required in which a user can select and adjust a state of a boiled rice like a medium rice, a hardboiled rice, or a sticky rice without opening or shutting the cover of the electric cooking kettle, and without increasing or reducing a water amount in the middle of cooking a rice.

U.S. Pat. No. 4,670,282 issued to Mazic Onishi, Keno Into, and Moria Isaiah on the date of Jun. 2, 1987, discloses one example of a method for selectively controlling a state of a boiled rice. A method for cooking rice according to the above U.S. patent comprises placing a mixture of water and rice in a pot; and heating the mixture of water and rice, while forming by convection heating within the mixture a temperature gradient which enables an upper portion of the mixture to have a temperature higher than that of a lower portion of the mixture, with a substantially ring shaped sheath electrical heater separated from the bottom of the pot and disposed in an airspace between the pot and a case which together form a continuous substantially sealed heating space, so that the upper portion of the mixture reaches an optimal cooking temperature range in a shorter time than the lower portion of the mixture, by the convection heating, and forms a mixture layer kept within the optical cooking temperature range, the rice located in the mixture layer absorbs more water than the rice located in the other regions, causing the surface of the water within the pot to gradually lower toward the bottom of the pot, and consequently the mixture layer gradually lowers, and while the mixture layer gradually lower, the rice located in each region in the pot remains within the optimal cooking temperature range for substantially the same length of time, whereby the rice in the pot uniformly absorbs the water independent of position within the pot. U.S. Pat. No. 4,670,282 has an effect capable of production involving no precision processing, and is constructed as to ensure substantially uniform cooking of rice contained in a pot, but fails to solve the conventional disadvantages that a user cannot select a state of a boiled rice like a medium rice, a hardboiled rice, or a sticky rice without increasing or reducing a water amount in the middle of cooking a rice.

SUMMARY OF THE INVENTION

Therefore, a first object of the present invention is to provide a method for selectively controlling a cooking state of a boiled rice in order to cook a rice to a state of a medium rice, a hardboiled rice, or a sticky rice, without adjusting a water amount during the cooking of the rice, and for changing a state of a boiled rice during the cooking process prior to a boiling held point.

In order to achieve the above-mentioned object of the present invention, there is provided a method for selectively controlling a state of a boiled rice, the method comprising the steps of:

a) judging whether or not the state of the boiled rice is selected after an absorbing process has started in an electric rice cooking kettle, and when it is judged that the state of the boiled rice is selected, storing the data of the state selected;

b) judging whether or not an internal pot temperature of the electric rice cooking kettle is equal to or greater than a soak controlling temperature corresponding to the selected state of the boiled rice in step a), and when the internal pot temperature is not equal to or greater than the corresponding soak controlling temperature, judging whether or not a corresponding soaking time has passed for the selected state of the boiled rice after the absorbing process has started;

c) heating the internal pot to a temperature for completing a first heating process when the corresponding soaking time has passed so that the absorbing process is completed, calculating a time from a temperature for beginning a first heating process to the temperature for completing a first heating process in order to judge the amount cooked, and to store the calculated time for judging the amount cooked;

d) heating the internal pot with a heat amount for a second heating process in response to the stored time for judging a cooking amount in step c) for the stored state of the boiled rice in step a), to perform a second heating process;

e) heating the internal pot with a heat amount for a corresponding heat-preserving process in response to the stored time for judging a cooking amount in step c) according for the stored state of the boiled rice in step a), to perform a heat-preserving process;

f) starting a steaming process, judging whether or not a corresponding steaming time has passed for the stored state of the boiled rice in step a) after the steaming process has started, and when the corresponding steaming time has passed, completing the steaming process.

At this time, preferably, the state of the boiled rice includes a medium rice, a hardboiled rice, a dry rice, a sticky rice, and a wet rice. More preferably, the soak controlling temperatures are highest to lowest in a order of the temperatures for a wet rice, a sticky rice, a medium rice, a hardboiled rice, and a dry rice. The heat amount for a second heating process is preferably calculated by means of the heat amount for a second heating process=S+(k/M)×G, where, S denotes a small heat amount from a basic heat amount of a second heating process in the corresponding state, the k represents the stored state of the boiled rice in step a), the M is a maximal required time for the first heating process by the electric rice heating kettle, and G denotes a margin from a basic heat amount of the second heating process in the corresponding state. The heat amount for a heat-preserving process is calculated by means of the heat amount for a heat-preserving process=S+(k/M)×G, where, S denotes a small heat amount from a basic heat amount of a heat-preserving process in the corresponding state, the k represents the stored state of the boiled rice in step a), the M is a maximal required time for the first heating process by the electric rice heating kettle, and G denotes a margin from a basic heat amount of the heat-preserving process in the corresponding state.

Preferably, the above method comprises the substeps of: b-1) judging again whether or not the internal pot temperature is equal to or greater than the corresponding soak controlling temperature in step b); and b-2) stopping an operation of a heater included in the electric rice cooking kettle when the internal pot temperature is equal to or greater than the corresponding soak controlling temperature, returning to the step for judging whether or not the corresponding soaking time has passed the internal pot temperature is equal to or greater than the corresponding soak controlling temperature, providing a corresponding soak heat amount according the inputted state of the boiled rice in step a) for the internal pot, and returning to the step of judging whether or not the internal pot is equal to or greater than the corresponding soak controlling temperature or more when the internal pot temperature is less than the corresponding soak controlling temperature.

More preferably, the above method comprises the substeps of: f-1) judging whether or not a corresponding steaming time has passed for the stored state of the boiled rice in step a) after the steaming process has started, when the corresponding steaming time has passed in step f), and when the corresponding steaming time has not passed, judging whether or not the internal pot is equal to or greater than a corresponding steam controlling time; and f-2) stopping an operation of the heater included in the electric rice cooking kettle and returning to the step of judging whether or not the corresponding steaming time has passed when the internal pot is equal to or greater than a corresponding steam controlling time, and providing a corresponding heat amount for the steaming process for the internal pot and returning to the step of judging whether or not the corresponding steaming time has passed when the internal pot is less than a corresponding steam controlling time.

The present invention can selectively cook a rice to states medium rice, hardboiled rice, or sticky rice, without adjusting a water amount during the cooking of the rice, and can change a state of a boiled rice during the cooking process prior to a heat-preserving point.

BRIEF DESCRIPTION OF THE DRAWINGS

The above objects and advantages of the present invention will become more apparent by describing in detail a preferred embodiment thereof with reference to the attached drawings, in which.

DESCRIPTION OF THE PREFERRED EMBODIMENT

A description will be given below in detail, with reference to the accompanying drawings, of the operation of a method for selectively controlling a state of a boiled rice according to one embodiment of the present invention.

Figure 1:
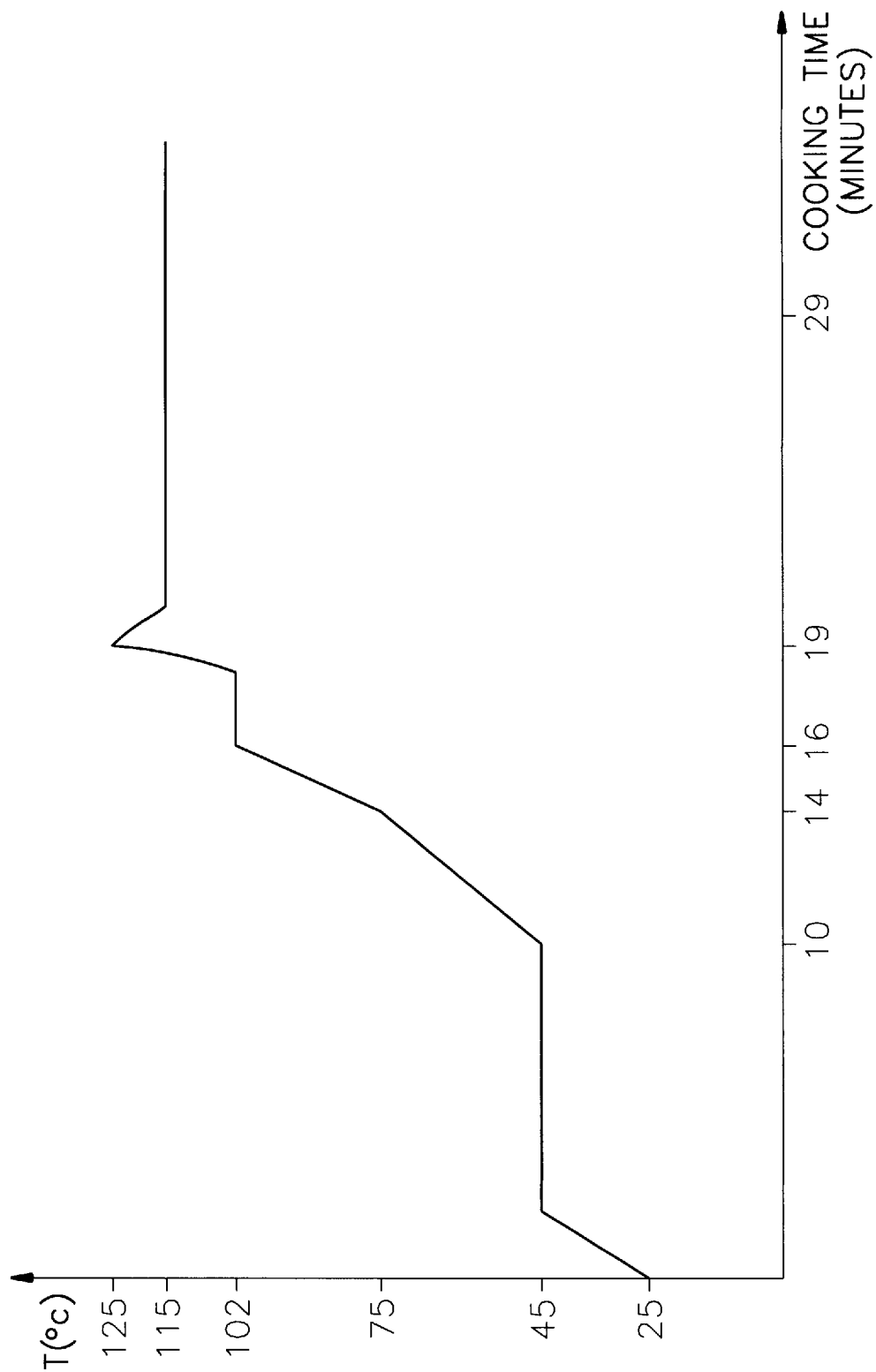
FIG. 1 is a graph for illustrating a general rice cooking process of an electric rice cooking kettle.
Figure 2:
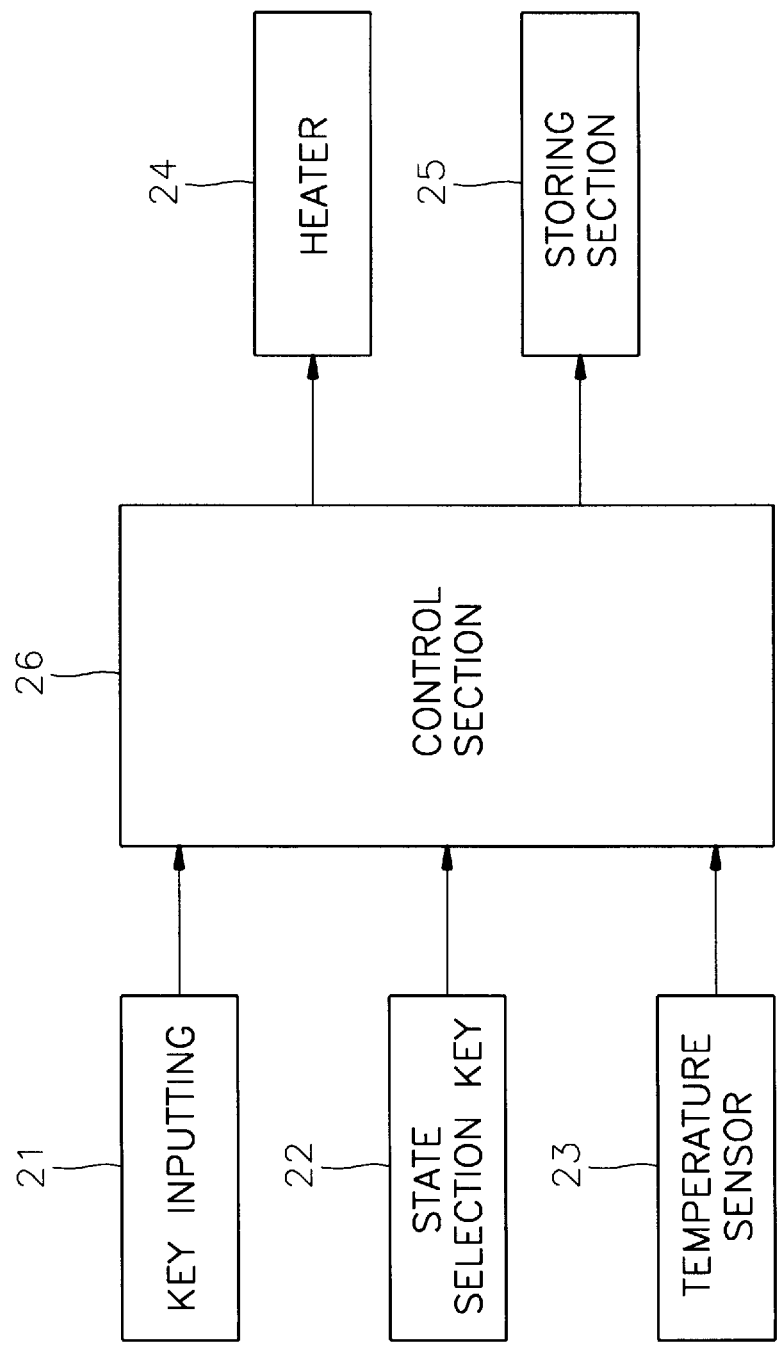
FIG. 2 is a block diagram for showing a circuitry configuration of an electric rice cooking kettle which can be used in the present invention.
Figure 3:
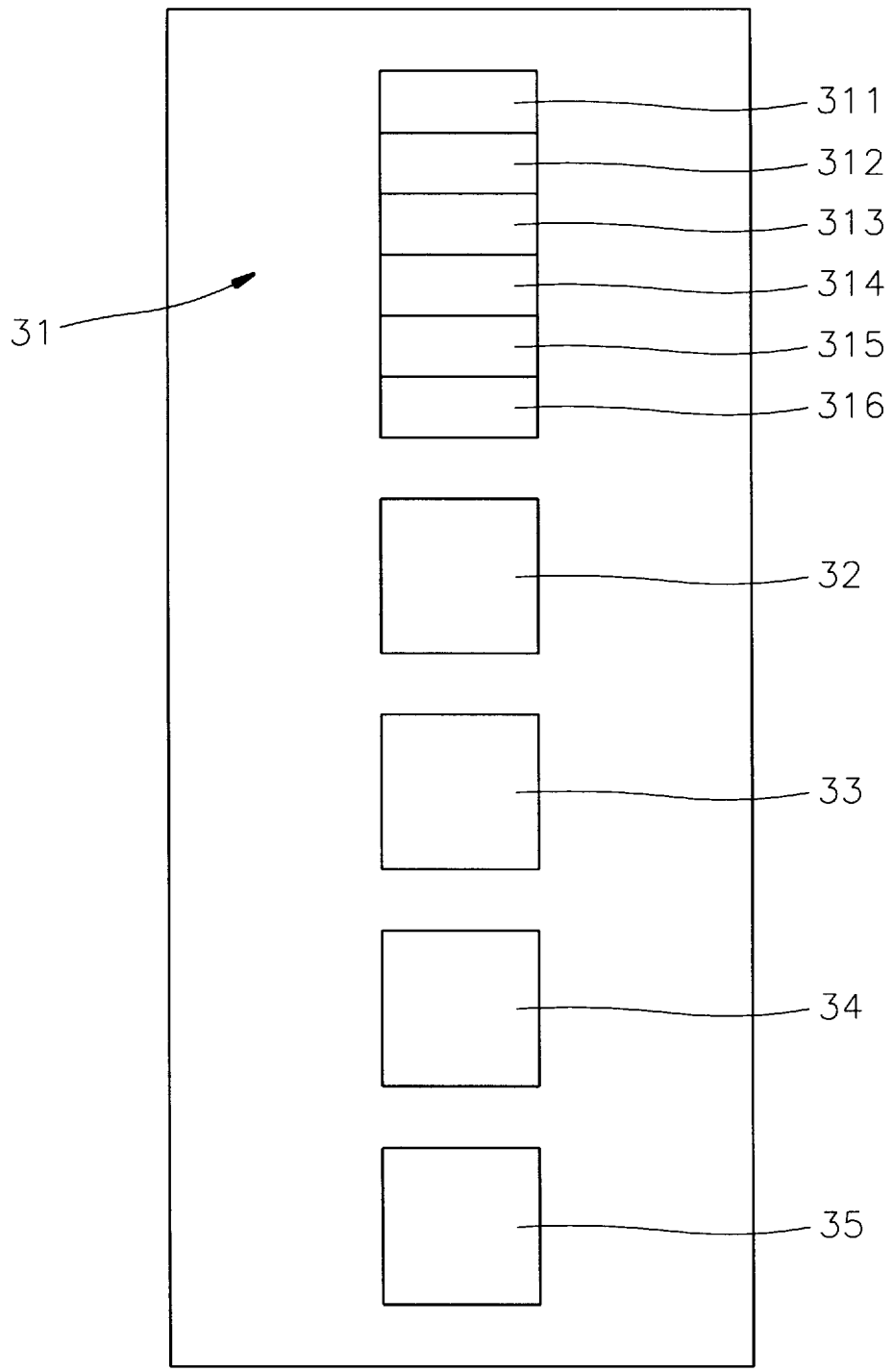
FIG. 3 is a schematic view for showing an example of a key inputting section in FIG. 2.

FIG. 2 is a block diagram for showing a circuitry configuration of an electric rice cooking kettle 2 which can be used in the present invention. The electric rice cooking kettle 2 includes a key inputting section 21, a state selecting key 22, an internal pot temperature sensor 23, a heater 24, a data storing section 25, and a control section 26. FIG. 3 is a schematic view for showing an example of a key inputting section 21 in FIG. 2. The key inputting section 21 inputs a command for activating a mode by menus and a command for indicating the beginning of cooking process. The key inputting section 21 includes a menu key 31, a key 32 for starting rice cooking, a steaming/cancellation key 33, a time selection key 34, and a reservation key 35. The menu key 31 includes a cleaned rice key 311, an uncleaned rice key 312, a grain key 313, a key 314 for selecting a scorched rice from the bottom of the pot, a key for selecting water boiled in a kettle where rice has been steamed, and an extraordinary steamed dish key 316.

Figure 4:
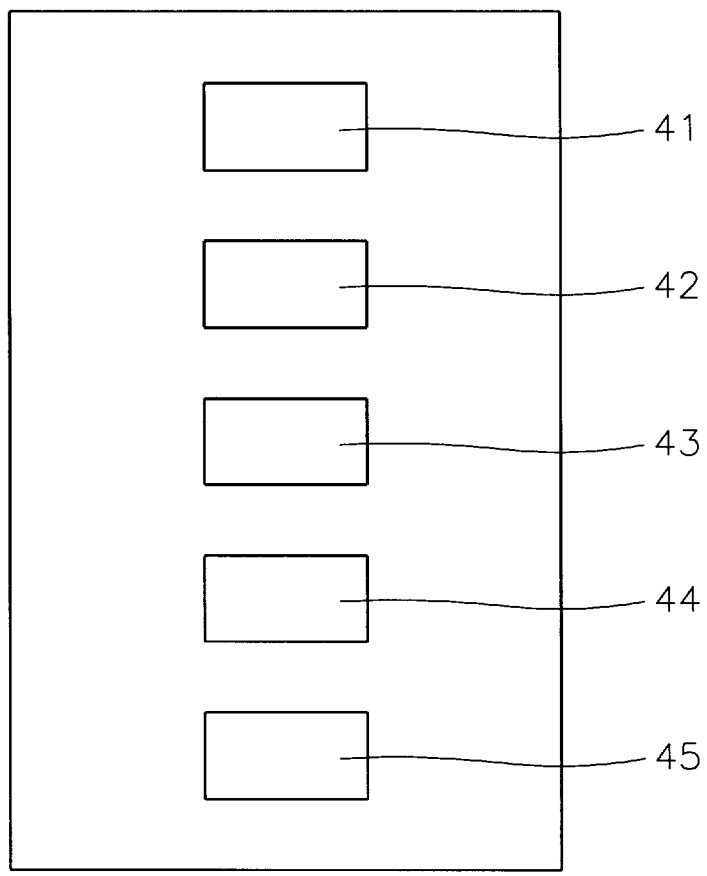
FIG. 4 is a schematic view for showing an example of a state selecting key in FIG. 2.

FIG. 4 is a schematic view for showing an example of state selection key 22 in FIG. 2. State selecting key 22 includes a medium rice key 41 for selecting a medium rice, a hardboiled rice key 42 for selecting a hardboiled rice, a very dry rice key 43 for selecting a dry rice (which is more hardboiled than the hardboiled rice), a sticky rice key 44 for selecting a sticky rice, and a wet rice key 45 for selecting a wet rice (which is stickier than the sticky rice). The medium rice, the hardboiled rice, the dry rice, the sticky rice, and the wet rice can be selected by medium rice key 41, hardboiled rice key 42, dry rice key 43, sticky rice key 44, and wet rice key 45, respectively.

Internal pot temperature sensor 23 senses the temperature of the bottom of an internal pot and provides the sensed temperature to control section 26 so that control section 26 can set a control reference of the operation state. Heater 24 includes rice cooking and steaming heaters (not shown), which turns on and turns off depending on a control output of control section 26 according to the condition of each process so that a heating operation can be performed for cooking a rice. Data storing section 25 selectively stores medium rice selection data, hardboiled rice selecting data, dry rice selection data, sticky rice selecting data, and wet rice selecting data. Data storing section 25 also stores a time for judging an amount of a rice cooking, that is, the time it takes to get from 50° C. to 75° C. during a first heating process. Data storing section 25 uses this data to decide a heating value during a second heating process and a heating preserving process according to an output control of control section 26.

Control section 26 activates a process according to the inputting conditions of key inputting section 21 and internal pot temperature sensor 23. Control section 26 receives the stored time data for judging an amount of a rice cooking from data storing section 25 and activates a processing program in the corresponding heating value, when it is judged that an input is present by means of state selecting key 22. In an embodiment of the present invention, in control section 25, soaking control temperatures of a medium rice, a hardboiled rice, and a sticky rice are programmed at 45° C., 40° C., and 50° C. respectively, and soaking times thereof at 10 minutes, 8 minutes, and 12 minutes respectively, soaking heat amount thereof at 70%, 80%, and 60% respectively with respect to a maximum heat amount of the electric rice cooking kettle of 100%. The heat amount of the medium rice, the hardboiled rice, and the sticky rice are programmed at 80%, 90% and 70% respectively with respect to a maximum heat amount of the electric rice cooking kettle of 100% during the first heating process. These amount are greater than the heat amount than the heat amount of the soaking process.

Figure 5:
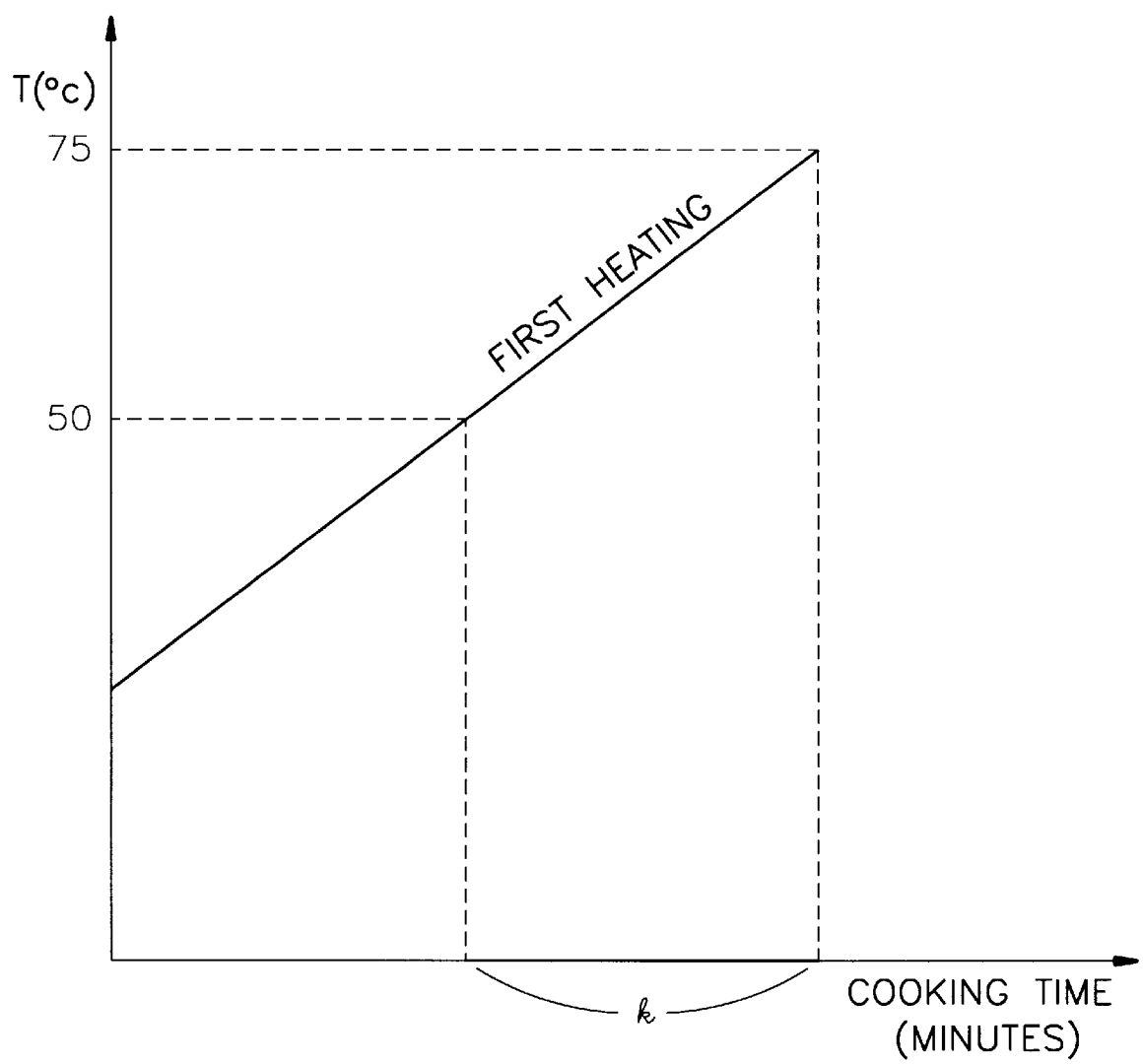
FIG. 5 is a graph for illustrating a judgement of a rice cooking amount according to one embodiment of the present invention.

FIG. 5 is a graph for illustrating a judgement of a rice cooking amount according to one embodiment of the present invention. Also, a maximal time M (the time required to cook a maximal degree, the very hardboiled rice) required for heating a internal pot temperature T from 50° C. is set as 500 seconds by control section 26 during the first heating process. A time required k for any rice cooking amount varies according to amount of rice being cooked. For instance, if the required maximum time M is 500 seconds, the required times of a small, middle, and large amount of medium rice is set as 100 seconds, 250 seconds, and 400 seconds. During the second heating process, since a standard heat amount of the medium rice is 80% with respect to a maximum heat amount 100% of electric rice cooking kettle 2, a variable percentage and a margin thereof are ±10% and 20% respectively, the heat amount thereof is 70%+(k/M)× 20%. Since a standard heat amount of the hardboiled rice is 90% with respect to a maximum heat amount of electric rice cooking kettle 2 of 100%, and since a variable percentage and a margin thereof are ±10% and 20% respectively, the heat amount thereof is 80%+(k/M)×20%. Since a standard heat amount of the sticky rice is 80% with respect to a maximum heat amount of 100%, and since a variable percentage and a margin thereof are ±10% and 20% respectively, the heat amount thereof is 60%+(k/M)×20%.

Figure 6:
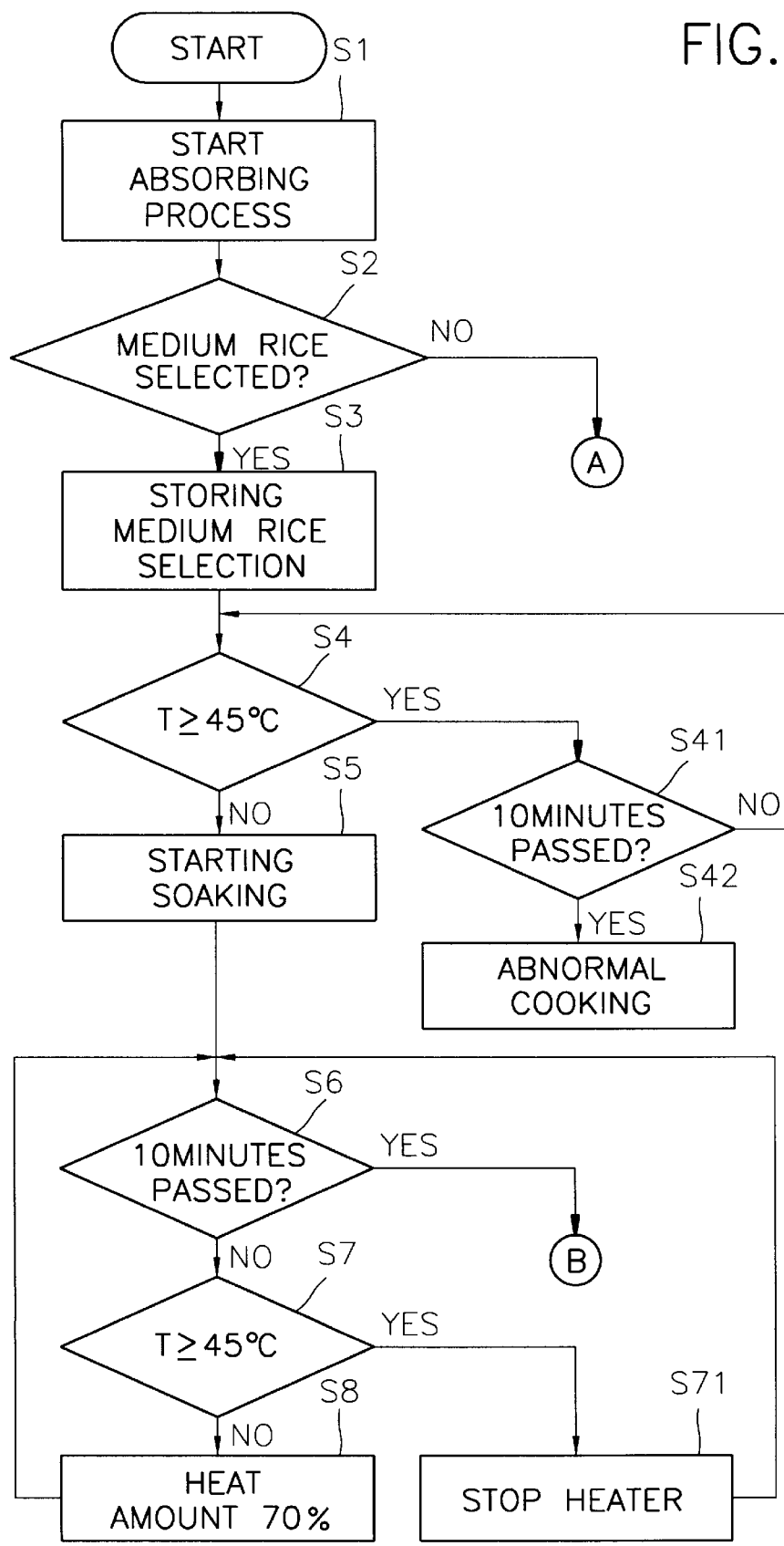
FIGS. 6 to 11 are a flow chart for illustrating a method for selectively controlling a state of a boiled rice according to one embodiment of the present invention.
Figure 7:
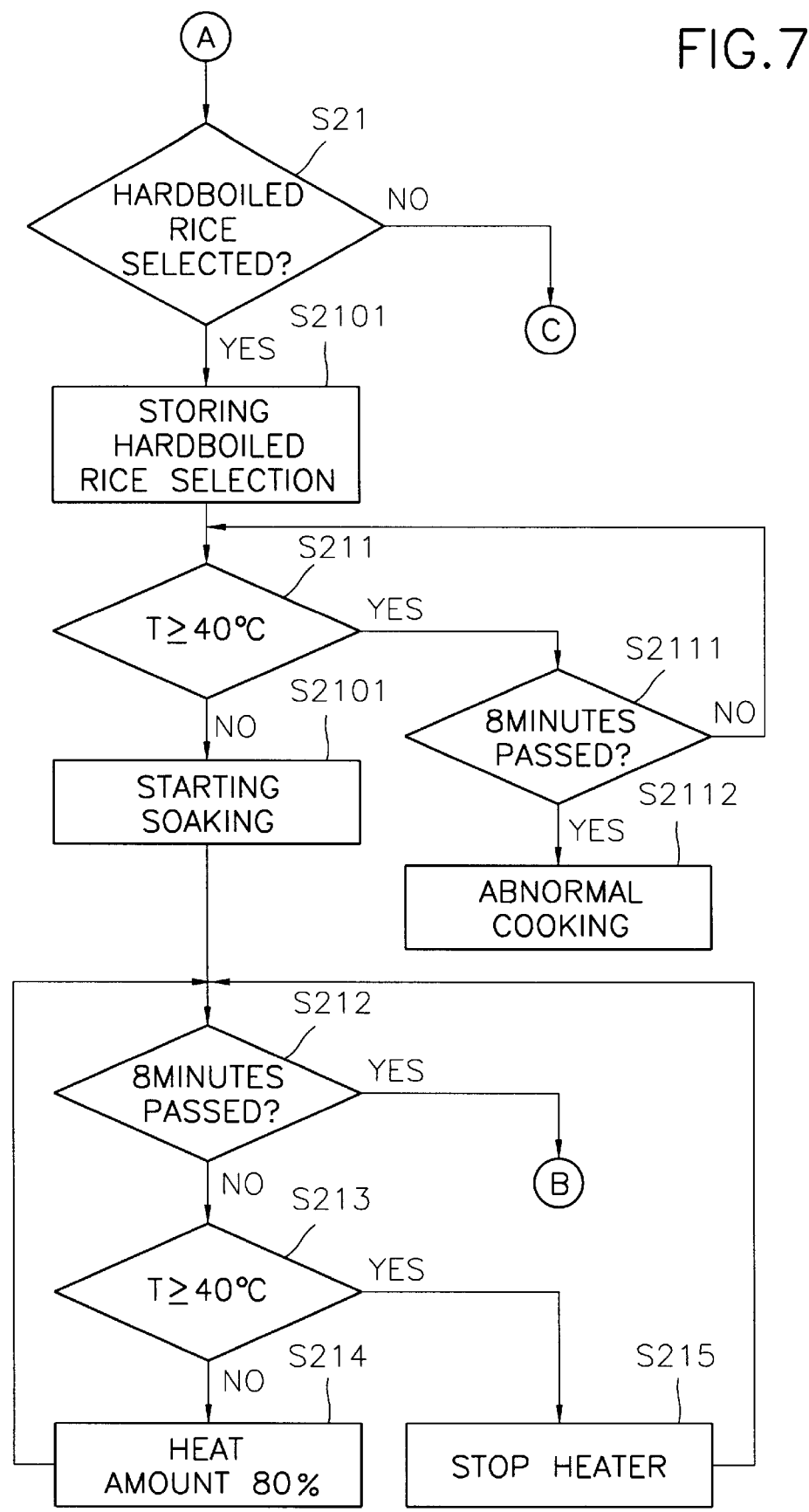
Figure 8:
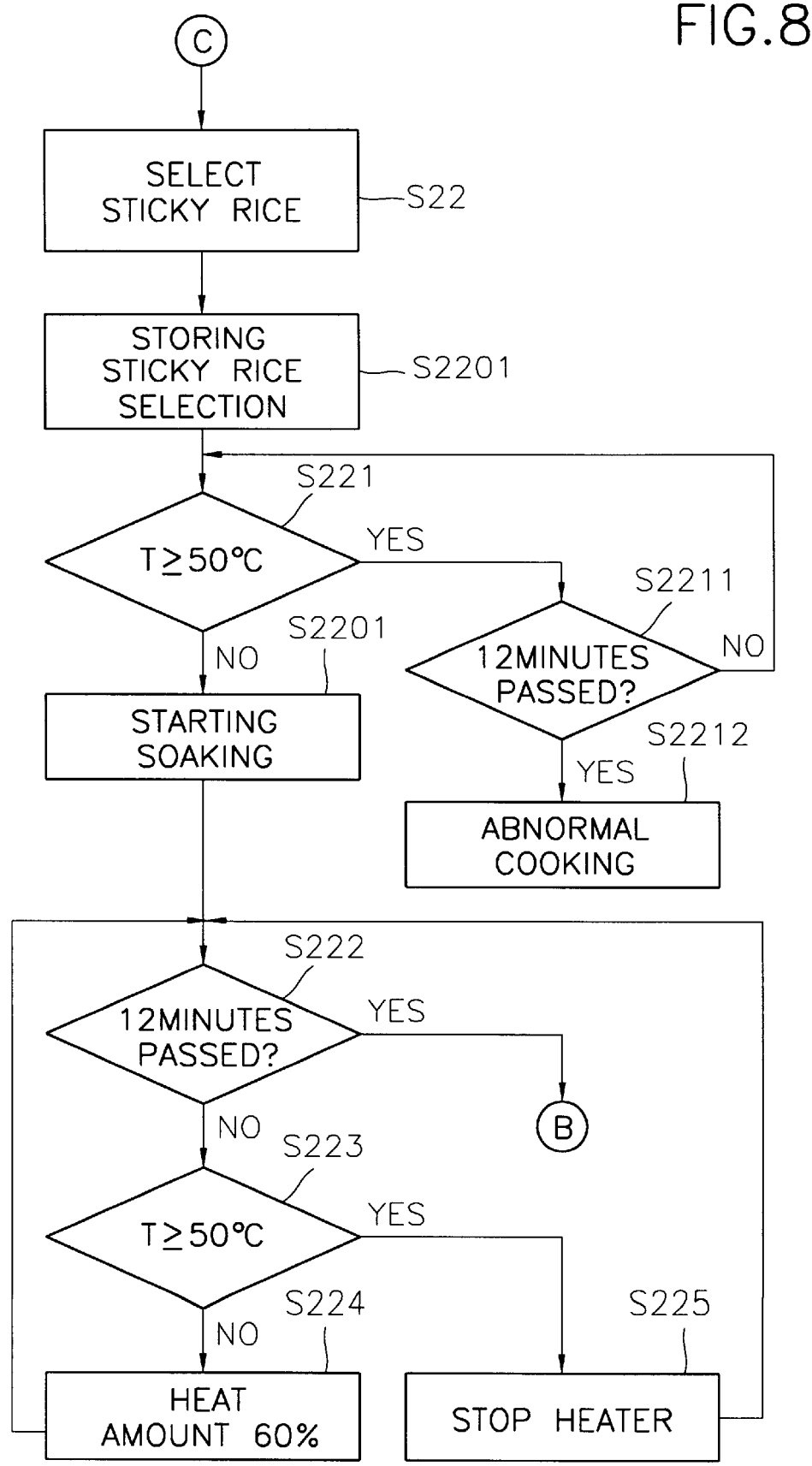
Figure 9:
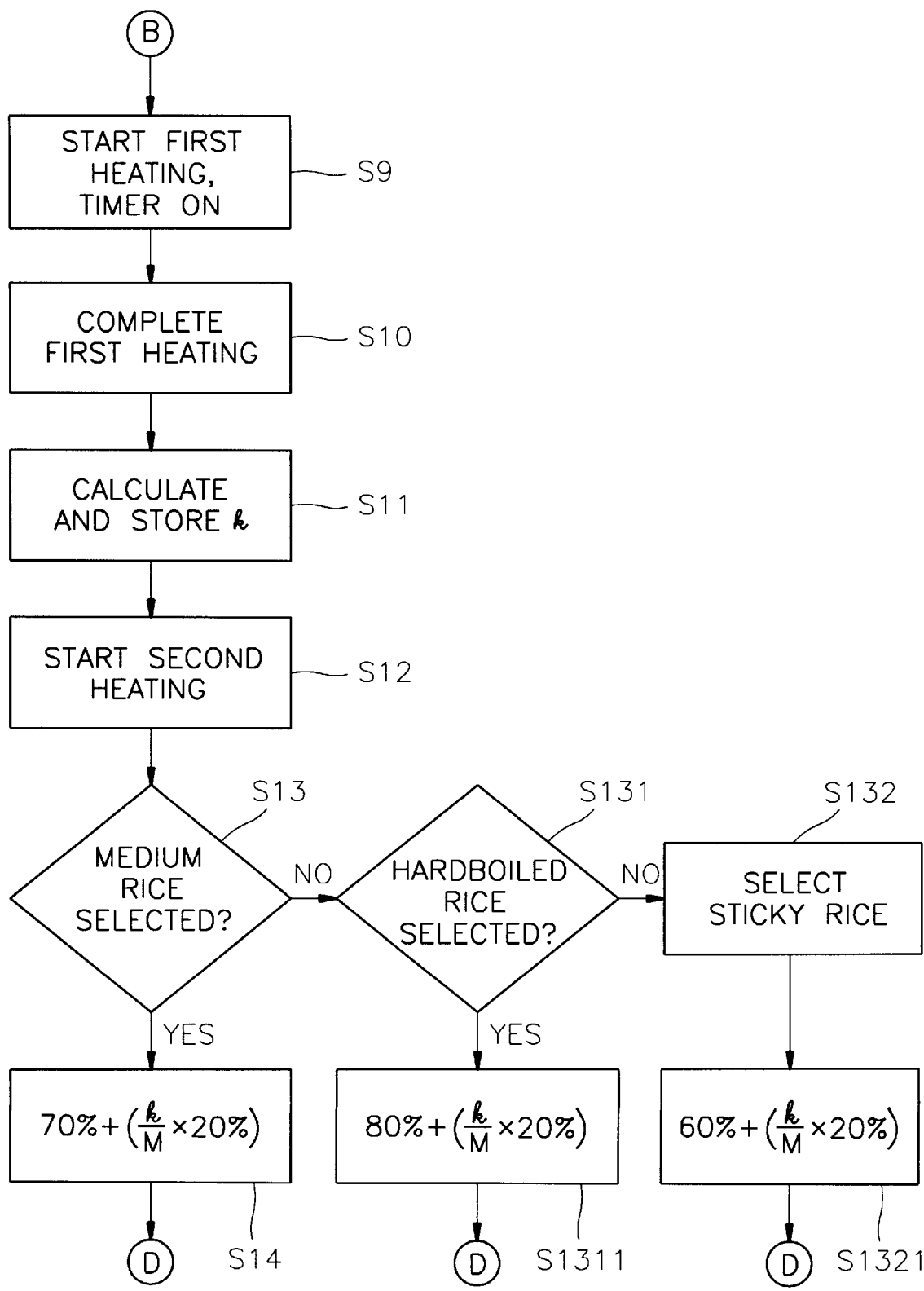
Figure 10:
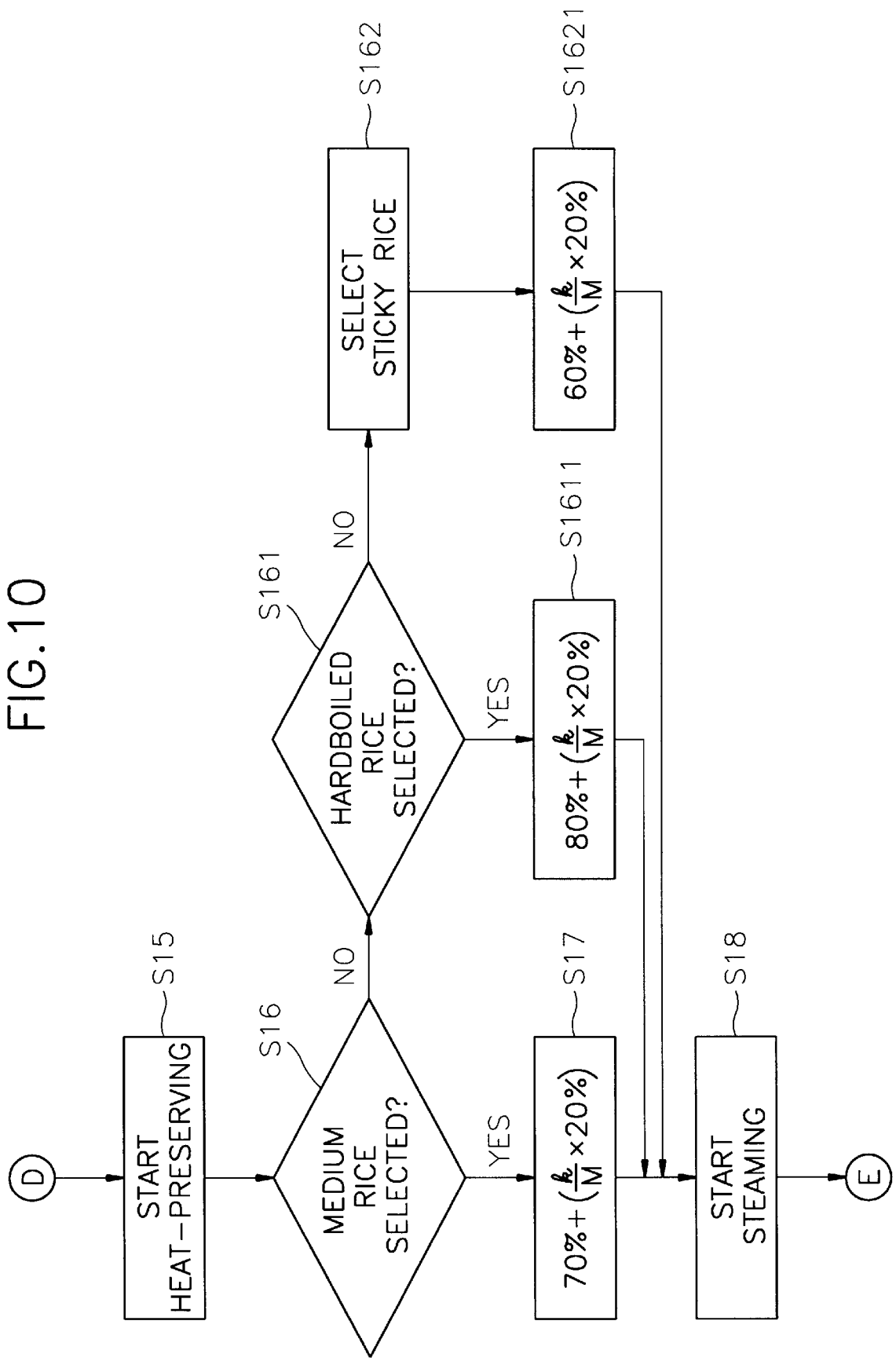
Figure 11:
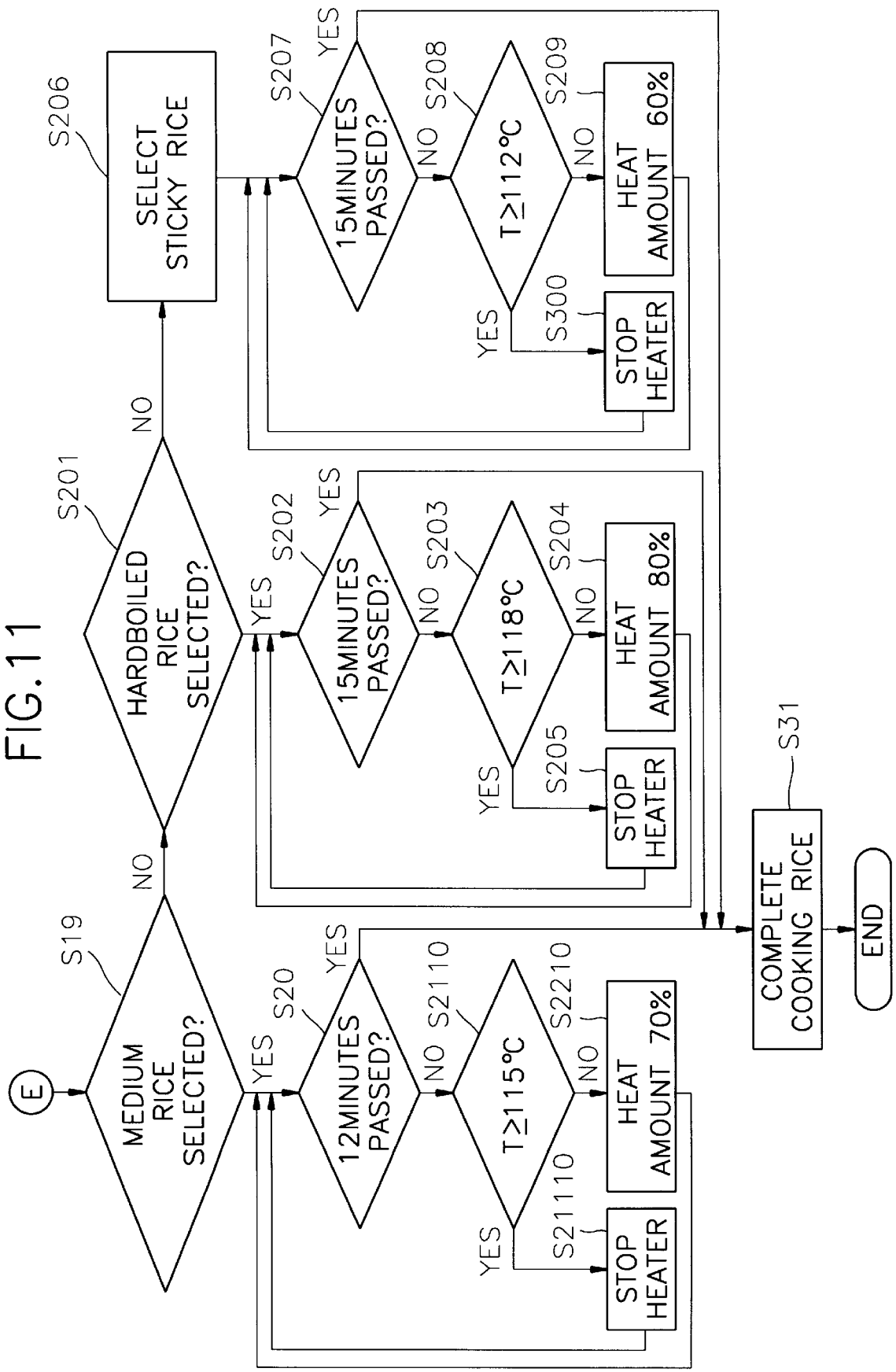

An operation of the method for selectively controlling a state of a boiled rice will be described referring to the accompanying drawings. FIGS. 6 to 8 are a flow chart for illustrating the method for selectively controlling a state of a boiled rice according to one embodiment of the present invention.

At first, after a user places a internal pot including a cooking rice and water therein into electric rice cooking kettle 2, the user selects from a menu by using menu key 31 included in key inputting section 21. Accordingly, rice cooking begins with an absorbing process (step S1). Then, medium rice key 41 of state selection key 22 is inputted by an operation of the user, so that control section 26 judges whether or not the medium rice is selected (step S2).

In step S2, when it is judged that the medium rice has selected, control section 26 stores the data of the selection of medium rice into data storing section 25 (step S3). Then, control section 26 controls internal pot temperature sensor 23 to sense an internal pot temperature T, that is, the temperature of the cooking rice and water, and judges whether or not the sensed internal pot temperature T is 45° C. or greater, the soak controlling temperature for the medium rice is 45° C. (step S4).

In step S4, when it is judged that the sensed internal pot temperature T is equal to or greater than ac (T≧45° C.), a soaking operation starts (step S5). Control section 26 then judges whether or not a medium rice soaking time of 10 minutes has passed (step S41). In step S41, when it is judged that the 10 minutes have not passed, the routine returns to step S4. But when it is judged that 10 minutes have passed, the routine goes to step S42, and control section 26 judges that the present state is an abnormal process, so control section 26 controls the abnormal process.

On the other hand, when it is judged in step S that the sensed internal pot temperature T is less than a soak controlling temperature of 45° C. (T<45° C.), control section 26 judges whether or not a medium rice soaking time of 10 minutes has passed after the soaking process has started (step S6).

In step S6, when it is judged that the 10 minutes have not passed, control section 26 again judges whether or not the internal pot temperature T, which was sensed by the internal pot temperature sensor 23, is equal to or greater than 45° C. (step S7).

In step S7, when it is judged that the sensed internal pot temperature T is equal to or greater than 45° C. (T≧45° C.), control section 26 stops heater 24 (step S71). The routine then returns to step S6 and performs the following steps again. However, in step S7, when it is judged that the sensed internal pot temperature T is less than 45° C. (T<45° C.), control section 26 controls the operation of heater 24 to heat the internal pot with a heat amount of 70% in order to soak the medium rice (step S8), and the routine returns to step S6. Then, steps S6, S7, and S8 are repeatedly performed in the same manner until the internal pot temperature T is at the soak controlling temperature for the medium rice so that the cooking rice is soaked completely, and the soaking (absorbing) process is completed.

On the other hand, when it is judged in step S2 that the medium rice was not selected, control section 26 judges whether or not is selected by the user by selecting the hardboiled rice key 42 (step S21).

In step S21, when it is judged that the hardboiled rice was selected, control section 26 stores data of the selection of the hardboiled rice into the data storing section 25 (step S2101). Then, control section 26 controls internal pot temperature sensor 23 to sense an internal pot temperature T and judges whether or not the sensed internal pot temperature T is equal to or greater than 40° C., a soak controlling temperature for the hardboiled rice is 40° C. (step S211).

In step S211, when it is judged that the sensed internal pot temperature T is equal to or greater than 40° C. (T≧40° C.), control section 26 judges whether or not a hardboiled rice soaking time of 8 minutes has passed (step S2111). In step S2111, when it is judged that 8 minutes have passed, the routine returns to step S211. But when it is judged that 8 minutes have passed, the routine goes to step S2112, and control section 26 judges that the present state is an abnormal process, so it controls the abnormal process.

On the other hand, in step S211, when it is judged that the sensed internal pot temperature T is less than a hardboiled rice soak controlling temperature of 40° C. (T<40° C.), control section 26 judges whether or not a medium rice soaking time of 8 minutes has passed after the soaking process has started (step S212).

In step S212, when it is judged that 8 minutes have passed after the soaking process has started, control section 26 again judges whether or not the internal pot temperature T, which was sensed by the internal pot temperature sensor 23, is equal to or greater than 40° C. (step S213).

In step S213, when it is judged that the sensed internal pot temperature T is equal to or greater than 40° C. (T≧40° C.), control section 26 stops heater 24 (step S215), and the routine returns to step S212 and performs the following steps. However, in step S213, when it is judged that the sensed internal pot temperature T is less than 40° C. or more (T<40° C.), control section 26 controls an operation of heater 24 to heat the internal pot with a heat amount of 80% for soaking the medium rice (step S214), and the routine returns to step S212. Then, the steps S212, S213, and S214 are repeatedly performed in the same manner until the internal pot temperature T is at the soak controlling temperature for the hardboiled rice so that the cooking rice is soaked completely, and the soaking (absorbing) process is completed.

On the other hand, in step S21, when it is judged that the hardboiled rice has not selected, control section 26 judges that a sticky rice has selected (step S22), from step S221 to step S224 are performed in the same manner as the absorbing process with respect to the medium and hardboiled rices so that the absorbing process is completed.

When it is judged that the soaking operation has started and that 10 minutes, 8 minutes, or 12 minutes have passed so that the absorbing process is completed in steps S6, S212 or S222, respectively, control section 26 controls an operation of heater 24 and turns-on a timer (not shown) so that the internal pot can be heated to the temperature for completing the first heat process (step S9). When the internal temperature T reaches the temperature for completing the first heating process, the first heating process is completed, and control section 26 turns-off the timer (step S10).

Then, control section 26 calculates a required time k of a temperature interval during the first heating process, that is, the time interval from a predetermined temperature of 50° C. to the temperature 75° C. for completing the first heat process by means of the timer as shown in FIG. 5, and stores the calculated value of k in the data storing section 25 (step S11). The calculated value of k is used as a judging reference for the cooking amount during a second heating process and a heat preserving process.

Next, the second heat process starts (step S12), control section 26 judges whether or not data of the selection of the medium rice are stored in data storing section 25 (step S13).

In step S13, when it is judged that the selection data of the medium rice are stored in data storing section 25, control section 26 controls an operation of heater 24 to heat the internal pot to a heat amount 70%+(k/M)×20% so that the second heating process can be completed (step S14). For instance, the 70%+(k/M)×20% for a small amount, a middle amount and a large amount of rice are 74%, 80% and 86%. Since the standard heat amount, the variable percentage, and the margin for medium rice are 80%, ±10% and 20%, respectively, the heat amount for the second heating process of the medium rice is 70%+(k/M)×20%. Since the standard heat amount, the variable percentage, and the margin for the hardboiled rice are 90%, ±10% and 20% respectively, a heat amount for the second heating process of the hardboiled rice is 80%+(k/M)×20%, since a standard heat amount, a variable percentage, and the margin for sticky rice are 70%, ±10% and 20% respectively, the heat amount for the second heating process of the sticky rice 60%+(k/M)×20%.

The maximal required time M during the first heating process by electric rice heating kettle 2 is 500 seconds. The first heating times required for a small amount, a middle amount, a large amount of medium rice, hardboiled rice and sticky rice are 100 seconds, 250 seconds, and 400 seconds. Examples of heat amount for the second heating and for a heating-preserving process described later, are shown in a table 1.

TABLE 1

| AMOUNT | MEDIUM RICE | HARDBOILED RICE | Sticky RICE |
|---|---|---|---|
| SMALL | 74% | 84% | 64% |
| MIDDLE | 80% | 90% | 70% |
| LARGE | 86% | 96% | 76% |

In step S13, when it is judged that data of the selection of the medium rice is not stored in data storing section 25, control section 26 judges whether or not the data of selection of the hardboiled rice is stored in data storing section 25 (step S131). In step S131, when it is judged that the selection data of the hardboiled rice is stored in the data storing section 25, control section 26 controls an operation of heater 24 to heat the internal pot to a heat amount of 80%+(k/M)×20% so that the second heating process can be completed (step S1311). For instance, 80%+(k/M)×20% of rice are 84%, 90%, and 96% for a small amount, a middle amount and a large amount as shown in table 1.

In step S131, when it is judged that data of selection of the hardboiled rice is not stored in data storing section 25, control section 26 judges that the selection data of the sticky rice are stored in data storing section 25 (step S132). Control section 26 controls an operation of heater 24 to heat the internal pot to heat amount 60%+(k/M)×20% so that the second heating process can be completed (step S1321). For instance, for a small amount, a middle amount and a large amount of rice, are the 60%+(k/M)×20%, 64%, 70% and 76% as shown in table 1.

Next, a heat-preserving process starts (step S15). Control section 26 judges whether or not data of selection of the medium rice is stored in data storing section 25 (step S16).

In step S16, when it is judged that data of selection of the medium rice is stored in data storing section 25, control section 26 controls an operation of heater 24 to heat the internal pot to a heat amount of 70%+(k/M)×20%, the same heat amount as that of the second heating process, so that the heat-preserving process can be completed (step S17). In step S16, when it is judged that data of selection of the medium rice is stored in data storing section 25, control section 26 judges whether or not data of selection of the hardboiled rice are stored in data storing section 25 (step S161). In step S161, when it is judged that data of selection of the hardboiled rice are stored in the data storing section 25, control section 26 controls an operation of heater 24 to heat the internal pot to a heat amount of 80%+(k/M)×20%, the same as the heat amount in the second heating process, so that the heat-preserving process can be completed (step S1611).

In step S161, when it is judged that data of selection of the hardboiled rice is not stored in the data storing section 25, control section 26 judges that data of selection of the sticky rice is stored in data storing section 25 (step S162), control section 26 then controls an operation of heater 24 to heat the internal pot to a heat amount of 60%+(k/M)×20% the same as heating in the second heating process so that the second heating process can be completed (step S1621).

After steps S17, S1611 and S1621 are performed so that the heat-preserving process is completed, a steaming process begins (step S18), control section 26 judges whether or not data of selection of the medium rice is stored in the data storing section 25 (step S19).

In step S19, when it is judged that data of selection of the medium rice is stored in data storing section 25, then control section 26 judges whether or not a steaming time of 12 minutes for the medium rice have passed after the steaming process has started (step S20). In step S20, when it is judged that the 12 minutes have not passed after the steaming process has started, control section 26 judges whether or not the sensed internal pot temperature T which is sensed by internal pot temperature sensor 23, is equal to or greater than 115° C. (step S2110).

In step S2110, when it is judged that the sensed internal pot temperature T is equal to or greater than 115° C. (T≧115° C.), control section 26 stops heater 24 (step S21110), and the routine returns to step S20 and performs the following steps. However, in step S2110, when it is judged that the sensed internal pot temperature T is less than 115° C. (T<115° C.), control section 26 controls an operation of heater 24 to heat the internal pot with a heat amount of 70%, the same as the heat amount for steaming the medium rice in the soaking process (step S2120), and the routine returns to step S20. Then, steps S20, S2110 and S2120 are repeatedly performed in the same manner, until the internal pot temperature T is at the steam controlling temperature for the medium rice so that the cooking rice is completely steamed, and the steaming process is completed.

In step S19, when it is judged that data of selection of the medium rice is not stored in data storing section 25, control section 26 judges whether or not data of selection of the hardboiled rice is stored in data storing section 25 (step S201).

In step S201, when it is judged that data of selection of the hardboiled rice is stored in data storing section 25, control section 26 judges whether or not a hardboiled rice steaming time of 15 minutes has passed after the steaming process has started (step S202). In step S202, when it is judged that the 15 minutes have passed after the steaming process has started, control section 26 judges whether or not the internal pot temperature T, which was sensed by internal pot temperature sensor 23 is equal to or greater than 118° C. (step S203).

In step S203, when it is judged that the sensed internal pot temperature T is equal to or greater than 118° C. (T≧118° C.), control section 26 stops heater 24 (step S205), and the routine returns to step S20 and performs the following steps. However, in step S21, when it is judged that the sensed internal pot temperature T is less than 118° C. (T<118° C.), control section 26 controls an operation of heater 24 to heat the internal pot with a heat amount 8%, the same as that for steaming the hardboiled rice in the soaking process (step S204), and the routine returns to step S202. Then, steps S202, S203 and S204 are repeatedly performed in the same manner, until the internal pot temperature T is kept at the steaming controlling temperature for the medium rice so that the cooking rice is kept completely warm, and the steaming process is completed.

On the other hand, in step S201, when it is judged that data of selection of the hardboiled rice is not stored in data storing section 25, control section 26 judges that data of selection of the sticky rice is stored in data storing section 25 (step S202). Then, steps S207, S208, S209 and S300 are performed in the same manner as that of the medium rice and the hardboiled rice so that the steaming process is completed.

When it is judged that the steaming operation has started and 12 minutes, 15 minutes, or 9 minutes have passed so that the steaming process is completed in steps S20, S202, or S207, respectively, the routine goes to step S31 and the control section finishes the cooking process, and the total routine is completed.

As mentioned previously, in the method for selectively controlling a state of a boiled rice according to the present invention, during the absorbing process, control section 26 judges whether or not a state of the hardboiled rice such as the medium rice, a hardboiled rice, and a sticky rice has been selected. When it is judged that the state of the boiled rice was selected, control section 26 stores data of the selected state into the data storing section 25. Then, control section 26 judges whether or not an internal pot temperature T is equal to or greater than a corresponding soaking process controlling temperature for the selected state of the boiled rice in the absorbing process. When it is not judged that the internal pot temperature T is equal to or greater than the corresponding soaking process controlling temperature, control section 26 judges whether or not the corresponding soaking time according to the selected state of the boiled rice has passed after the absorbing process has started. As a result of a judgement whether or not the corresponding soaking time has passed, when it is judged that the corresponding soaking time has passed so that the absorbing process is completed, control section 26 controls heater 24 to heat until a temperature for completing the first heating process is attained. Control section 26 then calculates a time k for judging the cooking amount from the temperature for beginning the first heating process to the temperature for completing the first heating process, and stores the calculated time k for judging the cooking amount in the data storing section 25.

Control section 26 controls heater 24 to heat to the corresponding heat amount for the second heating process and the corresponding amount for the heat-preserving process. The internal pot uses the stored time k for judging the cooking amount according to the stored state of the boiled rice in the data storing section 25 so that the second heating process and the heat-preserving process are performed, respectively. The steaming process begins and the control section judges whether or not a corresponding steaming time has passed after the steaming process has begun. When it is judged that the corresponding steaming time has passed, the steaming process is completed.

In the embodiment of the present invention, only the cooking method for medium rice, hardboiled rice, and sticky rice is described, but the cooking method for very hardboiled rice and a very sticky rice can be performed in the same manner. For instance, the cooking method can be performed by holding the soak controlling temperatures of dry rice and the wet rice at 55° C. and 35° C. respectively, soak times for the very hardboiled rice and very sticky rice in 14 minutes and 6 minutes, steaming times of the dry rice and the wet rice in 6 minutes and 8 minutes, soaking heat amount of the dry rice and the very sticky rice at 60% and 90% respectively with respect to a maximal heat amount of electric rice kettle 2 of 100%, and steam controlling temperatures for the dry rice and the wet rice at 109° C. and 121° C., respectively.

The present invention can selectively cook a rice to states medium rice, hardboiled rice, or sticky rice, without adjusting a water amount during the cooking of the rice, and can change a state of a boiled rice during the cooking process prior to a heat-preserving point.

As described above, although illustrative embodiments of the present invention have been described in detail herein, it is to be understood that the invention is not limited to those precise embodiments, and that various changes and modifications may be effects herein by one skilled in the art without departing from the scope or spirit of the invention.

What is claimed is:

1. A method for selectively controlling a rice cooking process of an electric rice cooking kettle which includes a state selecting key, a control section, a data storing section, an internal pot temperature sensor, and a heater, said method comprising the steps of:

a) placing an internal pot containing rice to be cooked with an appropriate amount of water in the electric rice cooking kettle, selecting a desired state of a boiled rice using the state selecting key, starting a soaking process in the electric rice cooking kettle, and when the state of the boiled rice is selected, setting the control section by the selected state which is stored in the data storing section;

b) sensing a temperature of the internal pot of the electric rice cooking kettle using the internal pot temperature sensor, comparing the sensed temperature of the internal pot with a set temperature of a soak process according to the selected state of the boiled rice, and when the internal pot temperature is not equal to or greater than the set temperature of the soak process, performing a soaking process during a set soaking time;

c) heating the internal pot to a temperature for completing a first heating process using the heater when the set soaking time has passed so that the absorbing process is completed, and calculating a time from a temperature for beginning the first heating process to the temperature for completing the first heating process in order to calculate an amount of the boiled rice, and storing the calculated time in the data storing section;

d) heating the internal pot with a heat amount for a second heating process in response to the stored time for calculating the amount in said step c) for the stored state of the boiled rice using the heater, to perform the second heating process;

e) heating the internal pot with a heat amount for a corresponding heat-preserving process in response to the stored time for calculating the amount in said step a) using the heater to perform a heat-preserving process; and f) performing a steaming process, for a steaming time corresponding to the stored state of the boiled rice, and when the steaming time has passed, completing the steaming process.

2. The method as claimed in claim 1, wherein the state of the boiled rice is selected from the following possible states: a medium rice, a hardboiled rice, a dry rice, a sticky rice and a wet rice.

3. The method as claimed in claim 2, wherein the soak controlling temperature corresponds to one of temperatures for the wet rice, the sticky rice, the medium rice, the hardboiled rice and the dry rice which are highest to lowest in an order of the temperatures.

4. The method as claimed in claim 3, wherein the temperatures of the sticky rice, the medium rice, and the hardboiled rice are fifty ° C., forty-five ° C. and forty ° C., respectively.

5. The method as claimed in claim 2, wherein the soaking time corresponds to one of predetermined times for the wet rice, the sticky rice, the medium rice, the hardboiled rice, and the dry rice.

6. The method as claimed in claim 5, wherein the predetermined times for the wet rice, the sticky rice, the medium rice, the hardboiled rice, and the dry rice are twelve minutes, ten minutes and eight minutes, respectively.

7. The method as claimed in claim 2, wherein the steaming time corresponds to one of predetermined times for the dry rice, the hardboiled rice, the medium rice, the sticky rice, and the wet rice.

8. The method as claimed in claim 7, wherein the predetermined steaming times of the hardboiled rice, the medium rice, and the sticky rice are fifteen minutes, twelve minutes, and nine minutes, respectively.

9. The method as claimed in claim 1, wherein the heat amount for a second heating process is calculated by means of the heat amount for a second heating process=$S1+(k/M) \times G1$, where, S1 denotes a small heat amount from a basic heat amount of a second heating process in a corresponding state, the k represents the stored state of the boiled rice in said step a), the M is a maximal required time for the first heating process by the electric rice heating kettle, and G1 denotes a margin from a basic heat amount of the second heating process in the corresponding state.

10. The method as claimed in claim 9, wherein the heat amount for a second heating process is decreased in an order of the amount for a dry rice, a hardboiled rice, a medium rice, a sticky rice, and a wet rice.

11. The method as claimed in claim 10, wherein the heat amount for a heat-preserving process is calculated by means of the heat amount for a heat-preserving process=$S2+(k/M) \times G2$, where, S2 denotes a small heat amount from a basic heat amount of a heat-preserving process in the corresponding state, the k represents the stored state of the boiled rice in said step a), the M is a maximal required time for the first heating process by the electric rice heating kettle, and G2 denotes a margin from a basic heat amount of the heat-preserving process in the corresponding state.

12. The method as claimed in claim 11, wherein the heat amount for the heat-preserving process is decreased in an order of the amount for a dry rice, a hardboiled rice, a medium rice, a sticky rice, and a wet rice.

13. The method as claimed in claim 1, wherein said method comprises the substep of:

performing an abnormal cooking process when the internal pot temperature is equal to or greater than a corresponding soak controlling temperature in said step b).

14. The method as claimed in claim 1, wherein said method comprises the substeps of:

b-1) comparing again the internal pot temperature with the corresponding soak controlling temperature in said step b); and b-2) stopping an operation of a heater included in the electric rice cooking kettle when the internal pot temperature is equal to or greater than the corresponding soak controlling temperature, returning to the step for performing the soaking process when the internal pot temperature is equal to or greater than the corresponding soak controlling temperature, providing a corresponding soak heat amount according to the inputted state of the boiled rice in said step a) for the internal pot, and returning to the step of performing the soaking process when the internal pot temperature is less than the corresponding soak controlling temperature, after said step b).

15. The method as claimed in claim 14, wherein the corresponding soak heat amount is decreased in an order of the amount for a dry rice, a hardboiled rice, a medium rice, a sticky rice and a wet rice.

16. The method as claimed in claim 15, wherein the corresponding soak heat amount of the wet rice, the hardboiled rice, the medium rice, the sticky rice and a wet rice are eighty %, seventy % and sixty %, respectively.

17. The method as claimed in claim 1, wherein said method comprises the substeps of:

f-1) determined whether or not a corresponding steaming time has passed for the stored state of the boiled rice in said step a) after the steaming process has started, when the corresponding steaming time has passed in said step f), and when the corresponding steaming time has not passed, determining whether or not the internal pot is equal to or greater than a corresponding steam controlling time; and f-2) stopping an operation of the heater included in the electric rice cooking kettle when the temperature of the internal pot is equal to or greater than a steam controlling temperature, and providing a corresponding heat amount for the steaming process for the internal pot and returning to the step of performing the steaming process when the internal pot is less than the steam controlling temperature.

18. The method as claimed in claim 17, wherein the steam controlling temperature is decreased in an order of the temperatures for a dry rice, a hardboiled rice, a medium rice, a sticky rice and a wet rice.

19. The method as claimed in claim 18, wherein the steam controlling temperature of the hardboiled rice, the medium rice, and the sticky rice are 118° C., 115° C., 112° C., respectively.

20. A method for selectively controlling a rice cooking process of an electric rice cooking kettle which includes a state selecting key, a control section, a data storing section, an internal pot temperature sensor, and a heater, said method comprising the steps of:

i) placing an internal pot containing rice to be cooked with an appropriate amount of water in the electric rice cooking kettle, selecting a state of a boiled rice through the state selecting key, starting an absorbing process in the electric rice cooking kettle, and setting the control section by the selected state in the data storing section included in the electric rice cooking kettle;

ii) sensing a temperature of the internal pot of the electric rice cooking kettle through the internal pot temperature sensor, comparing the sensed temperature of the internal pot with a set temperature of a soak process for the selected state of the boiled rice in said step i), and when the internal pot temperature is less than the set temperature of the soak process, performing a soaking process for a set soaking time;

iii) heating the internal pot to a temperature for completing a first heating process through the heater when the set soaking time has passed so that the absorbing process is completed, and calculating a time from a temperature for beginning a first heating process to the temperature for completing the first heating process in order to calculate an amount of the boiled rice, and storing the calculated time in the data storing section;

iv) heating the internal pot with a heat amount for a second heating process in response to the stored time for calculating the amount in the data storing section through the heater, to perform the second heating process;

v) heating the internal pot with a heat amount for a corresponding heat-preserving process in response to the stored time for calculating the amount in the data storing section for the stored state of the boiled rice in said step iv) through the heater, to perform a heat-preserving process;

vi) starting a steaming process for a corresponding steam time for the stored state in the data storing section; and vii) comparing the internal pot temperature with a corresponding steam controlling temperature, stopping an operation of the heater to return to the steaming process when the internal pot temperature is a corresponding steam controlling temperature, and providing a corresponding heating for the steaming process for the internal pot to return to the steaming process when the internal pot temperature is not the corresponding steam controlling temperature, and when the corresponding steaming time has not passed, and completing the steaming process when the corresponding steaming time has passed.

* * * * *